United States Patent [19]

Chamberlain

[11] 4,158,972
[45] Jun. 26, 1979

[54] RING GEAR POSITIONER

[75] Inventor: Richard W. Chamberlain, Aurora, Ill.

[73] Assignee: Caterpillar Tractor Co., Peoria, Ill.

[21] Appl. No.: 879,303

[22] Filed: Feb. 21, 1978

[51] Int. Cl.² .............................................. F16H 1/28
[52] U.S. Cl. ..................................... 74/801; 74/750 R
[58] Field of Search ............................ 74/801, 750 R

[56] References Cited

U.S. PATENT DOCUMENTS

| | | | |
|---|---|---|---|
| 2,543,453 | 2/1951 | Fuller | 74/750 R X |
| 2,591,743 | 4/1952 | Thompson | 74/801 |
| 2,684,591 | 7/1954 | Lundquist | 74/801 |
| 3,011,365 | 12/1961 | Stoeckicht | 74/801 |
| 3,452,612 | 7/1969 | Casey | 74/801 X |

*Primary Examiner*—Lance W. Chandler
*Attorney, Agent, or Firm*—Sixbey, Bradford & Leedom

[57] ABSTRACT

In a double planetary reduction final drive gearing arrangement for vehicles, a composite ring gear including two ring gear segments, and means for positioning and mounting the ring gear segments in the gearing arrangement, the composite providing a stepped reduction gear ratio and manufacturing economies and advantages.

15 Claims, 6 Drawing Figures

RING GEAR POSITIONER

BACKGROUND OF THE INVENTION

The present invention relates generally to gear drive mechanisms for wheeled vehicles in the nature of heavy duty apparatus used for construction, earth working, earth moving and the like.

More specifically, the invention relates to a double planetary drive assembly of large size and capacity for such vehicles, gears therein being of such size that a single ring gear, as sometimes heretofore used, can cause substantial difficulties in manufacture, primarily in shaping the ring gear teeth due to the very long shaper stroke required. Additionally, in large single ring gears, heat treating and the holding of required tolerances can also cause substantial difficulties.

Examples of final drive assemblies constituting prior art are shown for example in U.S. Pat. No. 3,452,612, entitled WHEEL DRIVE MECHANISM, and assigned to a common assignee herewith; and as set forth in my copending application for patent entitled WHEEL FINAL DRIVE ASSEMBLY FOR VEHICLES, application Ser. No. 879,304, filed Feb. 21, 1978, and also assigned to a common assignee herewith. In this patented structure, a single ring gear is shown, and the foregoing problems can exist with increases in size. In my copending application a composite or two-piece ring gear is broadly shown and contemplated, as are mounting means in the gear arrangement or system.

The present invention and application are directed to a composite, two component, or two piece, ring gear in a planetary system of the type in question. The present application discloses a construction which overcomes drawbacks and problems existing in prior known structures, and the structure further provides new and improved results as will appear hereinafter.

It is accordingly a primary object of the present invention to eliminate, in so far as possible, drawbacks existent in prior known and used apparatus, and further to provide a ring gear structure in a planetary gearing arrangement or system of a substantial advance in the art, and having meritorious improvements both from the standpoint of manufacture and operating capabilities and characteristics.

SUMMARY OF THE INVENTION

The present invention accordingly is directed to a double planetary final drive of large size and capacity for use in heavy duty vehicles, and wherein a ring gear incorporated in the double planetary reduction final drive arrangement is a multiple component unit, the construction providing means to position and combine the two sections or components.

In a final drive arrangement comprising a double planetary gear reduction assembly, a two piece or component ring gear is incorporated, and of a structure whereby the composite ring gear provides a stepped reduction gear ratio. Means are also provided to secure the two halves or components of the ring gear together in a stationary relationship. The fastening and securing means include clip or lock means that cooperate with the two ring gear components and structure therein, the clips being removably secured and accordingly the two pieces of the ring gear are separable and/or selectively mountable in the gearing arrangement.

The present structure, including two relatively narrow ring gears joined together to form a composite single entity substantially reduces manufacturing problems, and a two ring gear planetary system has additional advantages in that different gear pitches can be used on the two segments, for example a finer pitch for a lighter loaded inner planetary.

A further advantage of the present invention resides in economies of both weight and manufacturing, and the stepped reduction gear ratio, utilizing ring gear segments or pieces of different diameters, allows a greater range of ratios in a double planetary system.

Additional objects, features and advantages of the invention will be more readily apparent from the following detailed description of an embodiment thereof when taken together with the accompanying drawings in which.

DETAILED DESCRIPTION OF THE INVENTION

Figure 1:
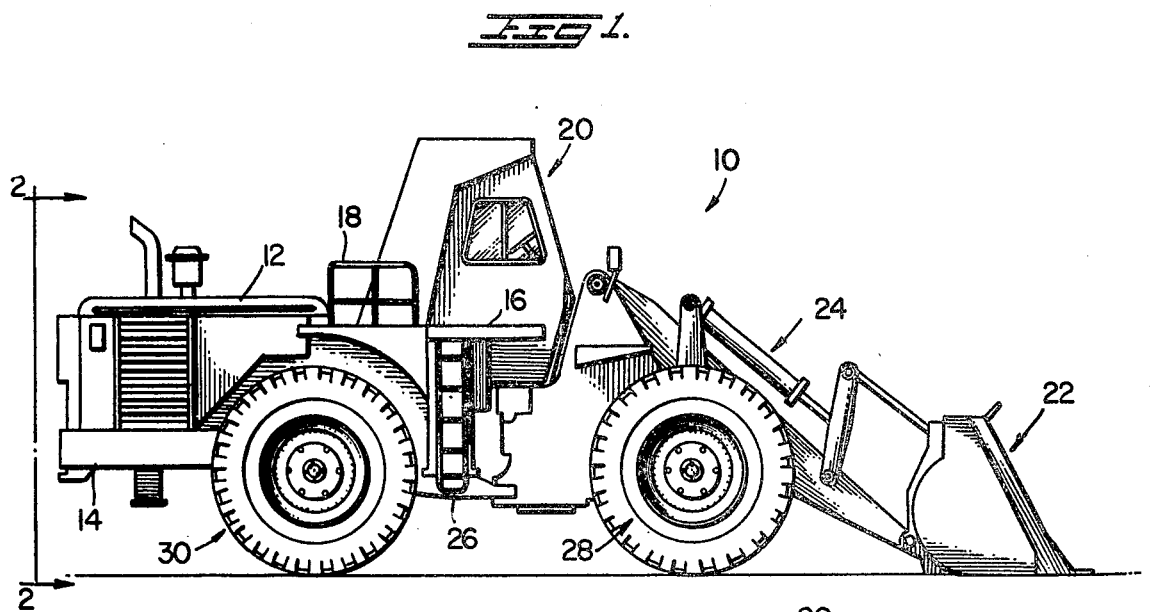
FIG. 1 is a side elevational view of a wheeled vehicle of a type with which the present double planetary gearing arrangement or system is used, and more particularly a front end loader of substantial size.
Figure 2:
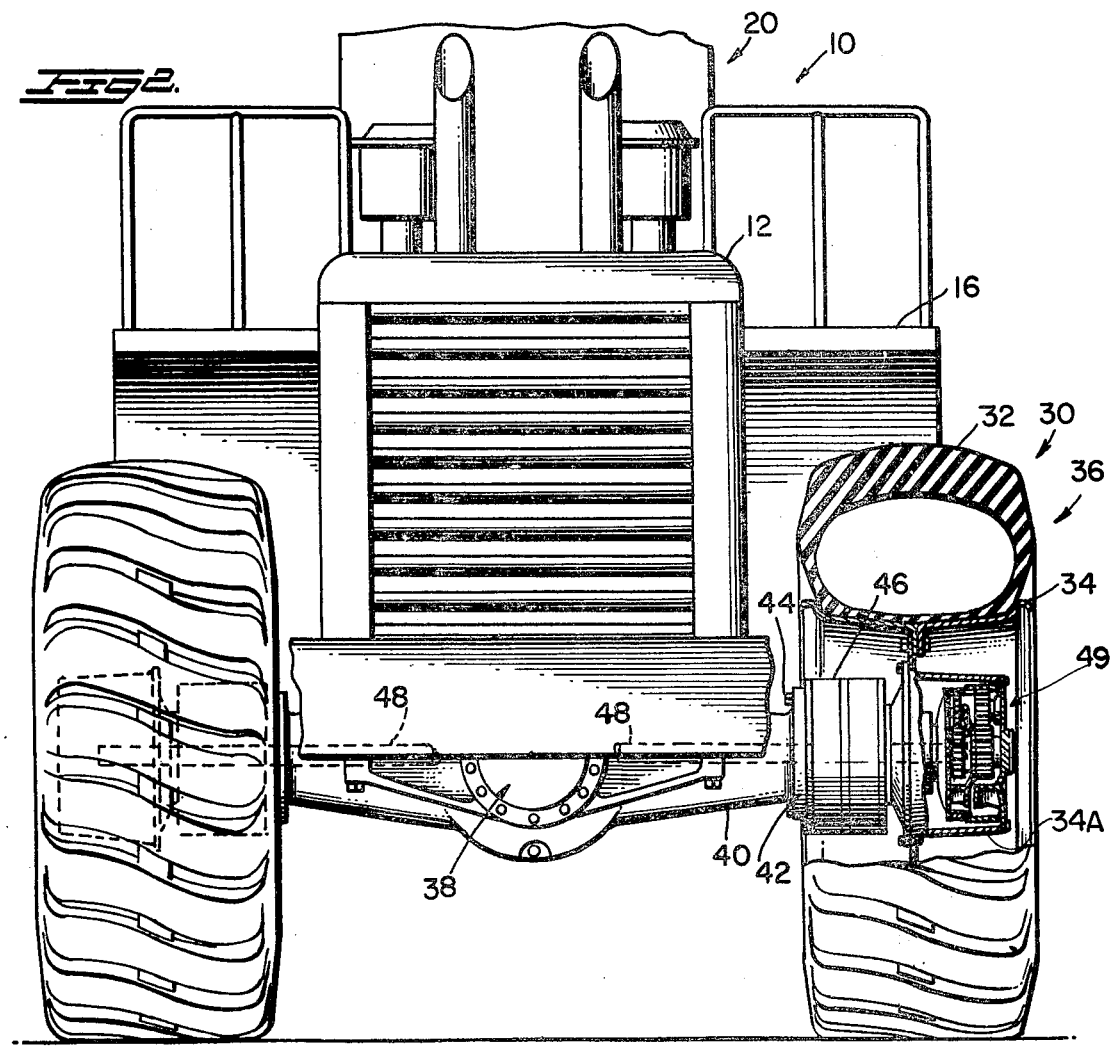
FIG. 2 is a fragmentary enlarged rear elevational view, portions being broken away and sectioned, for disclosing in a general way a gearing system as associated with a vehicle drive wheel.

FIGS. 1 and 2 disclose a type of vehicle with which a double planetary final drive assembly of large size and capacity is used. As shown, a wheeled front end loader 10 includes an engine compartment assembly 12, a bumper 14, an operator's platform 16, a guard rail 18 on platform 16, an operator's cab 20, a bucket 22 of a general type operable through hydraulic piston and cylinder means generally shown at 24, and an access ladder 26 to the operator's platform. The vehicle is equipped with wheel and tire units or assemblies 28 and 30. The vehicle is of a structure manufactured by the assignee of the present application.

Wheel loaders manufactured by the assignee company, of a type to which the present invention is applicable, are generally discussed herein as a background for the present invention, and to show desirability of the present structure. The vehicles are of substantial size and weight, and the dimensions and specifications play a part in the design of the invention, as also manufacture and assembly thereof, while incorporating improved operating characteristics.

FIG. 2 of the drawing discloses in greater detail the wheel assembly, only one of which is described herein in detail. The wheel assembly includes tire 32 mounted on a split rim 34, the wheel being generally designated 36. Each of the wheels, four being used in four wheel drive units, or at least two in types of vehicles with which the invention is associated, are generally separately driven from a power train through a differential, the housing of which is indicated at 38, and from which extends a hollow differential axle housing 40 terminating in end flanges 42, bolted at 44 to wheel brake hub 46.

Axle drive shafts 48, shown in dotted lines, operatively connect the differential in the drive train to the wheel drive assembly in a known manner.

The double planetary gear reduction assembly in the final drive arrangement is operatively mounted and positioned within the rim portion 34A of the split rim 34, and is generally designated 49 in FIG. 2. The gearing arrangement is operatively coupled to the drive axles 48 and to the individual drive wheels in a known manner, and as shown in greater detail for example in my copending patent application above identified, Ser. No. 879,304.

The final drive gearing arrangement, as described in greater detail in my copending patent application, includes a stationary fixed axle shaft support and housing 50 through which the axle shaft 48 extends, and which, by virtue of a toothed or splined end 52, is operatively connected into the gearing arrangement. The gear train includes a primary sun gear 54 operatively engaged with the splining at 52, and this primary sun gear in turn is operatively engaged with planetary gears 56, which are operatively mounted in a usual manner on primary planet gear carrier 58. The planetary gears as usual are mounted on stub shafts 60. A clamp or retainer plate 62 is bolted to the open end of axle housing 50. A bell shaped gear support member or ring gear hub 64 is splinedly connected at 66 to the exterior end of axle housing 50.

A composite or two piece ring gear structure in accordance with the invention includes a first ring gear piece 68, and a second ring gear piece, segment, or component, 70 as shown. The first ring gear piece 68 is mounted to its hub 64 by the conventional method of tooth extension in a known manner. The hub 64 has teeth 72 machined on the outside diameter thereof that mate with internal teeth 74 of ring gear piece 68, and the ring gear piece is held in place on the hub by means of locks or locking plates 76, bolted at 78 to the hub, and which locks or plates 76 are seated in a groove 80. The gear piece or component 68 is assembled on, and secured to, hub 64 prior to assembly of the rest of the planetary gear system. This manner of mounting of the ring gear piece 68 to its hub is, as mentioned, the conventional method of tooth extension, and bolting in keeper plates.

As previously pointed out, a double planetary final drive of large size and capacity, with a single ring gear, as shown for example in U.S. Pat. No. 3,452,612, requires a proportionately very wide ring. This width causes difficulties in shaping of the ring gear teeth due to the very long shaper stroke required. Heat treating, and holding required tolerances, is also very difficult. The present invention obviates or overcomes these difficulties by providing a two piece ring gear construction, the two pieces being each of more narrow width, and thus overcoming manufacturing difficulties. The composite, however, provides the required width for operation, and strength, as also improved operating characteristic possibilities.

The second ring gear component or piece 70, generally speaking, is mounted on and attached securely to first ring gear piece 68, as will appear more specifically hereinafter. This second ring gear component or piece 70 is operatively associated with the second planetary system, and interior teeth 82 of ring gear piece 70 are operatively engaged with teeth on secondary planet gears 84, operatively mounted on stub shafts 86, mounted on hub plate cover 90.

Figure 3:
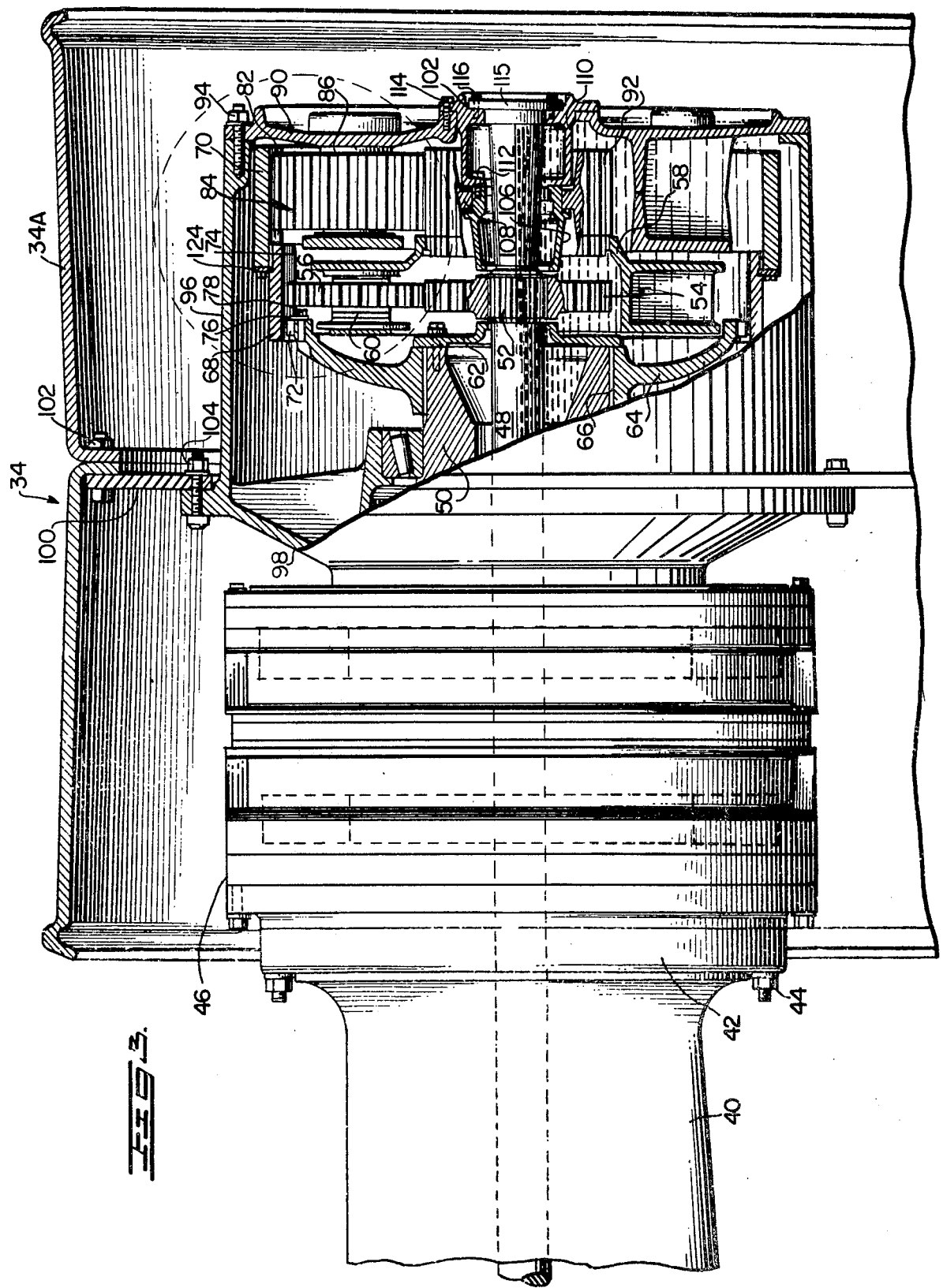
FIG. 3 is an enlarged fragmentary view, with parts broken away, and partially in section, of a wheel final drive assembly and system incorporating the present invention.

The planetary gears 84 are in operative engagement with secondary sun gear 92. As pointed out in greater detail in my copending patent application, this secondary sun gear is uniquely mounted in the gear train system or assembly. To this end the hub plate cover 90 which has a central opening therein, is secured by nut, bolt combinations at 94 to an annular portion 96 of rotatable hub 98. The rotatable hub 98 in turn mounts the split rim 34 by means of ring 100, with bolts or the like 102, 104. This hub 98 is driven through the gearing system by virtue of the secondary planetary gearing being mounted to hub plate cover 90. In assembly of the gearing system, preliminary to insertion and association of secondary sun gear in the gear train, a hollow inner hub part 106 is inserted through the central opening, and subsequently inner apertured central web 108 of secondary sun gear 92 is positioned, the secondary sun gear being supported in operative position by association with the secondary planetary gearing members as shown in FIG. 3. An outer hollow hub part 110 is then inserted and joined to hollow hub part 106 by bolts at 112. The hollow hub part 110 is attached to hub plate cover 90 by bolts at 114. A spacer plug 115 is insertable through the hollow interiors of the hollow hub parts 106 and 110, and is then attached at 116 to the outer hub part 110. The inner end of the spacer plug 115 operatively contacts the outer end of shaft 48, and serves to position it and the primary sun gear 54 carried thereon, in the gear train. This structure is also described and shown in greater detail in my copending patent application.

Figure 4:
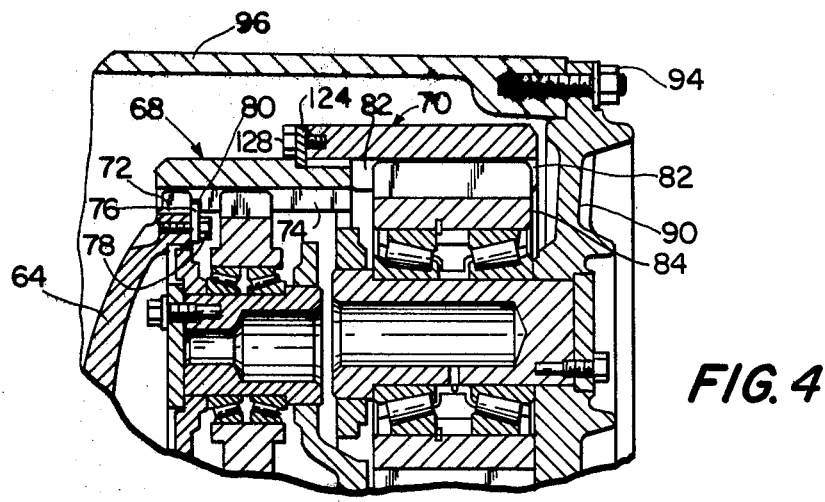
FIG. 4 is an enlarged view of that designated portion of FIG. 3 within the broken line circle.
Figure 6:
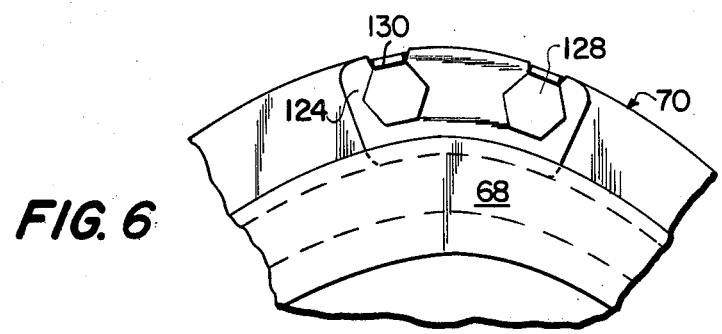
FIG. 6 is a substantially enlarged view taken on line 6—6 of FIG. 5.
Figure 5:
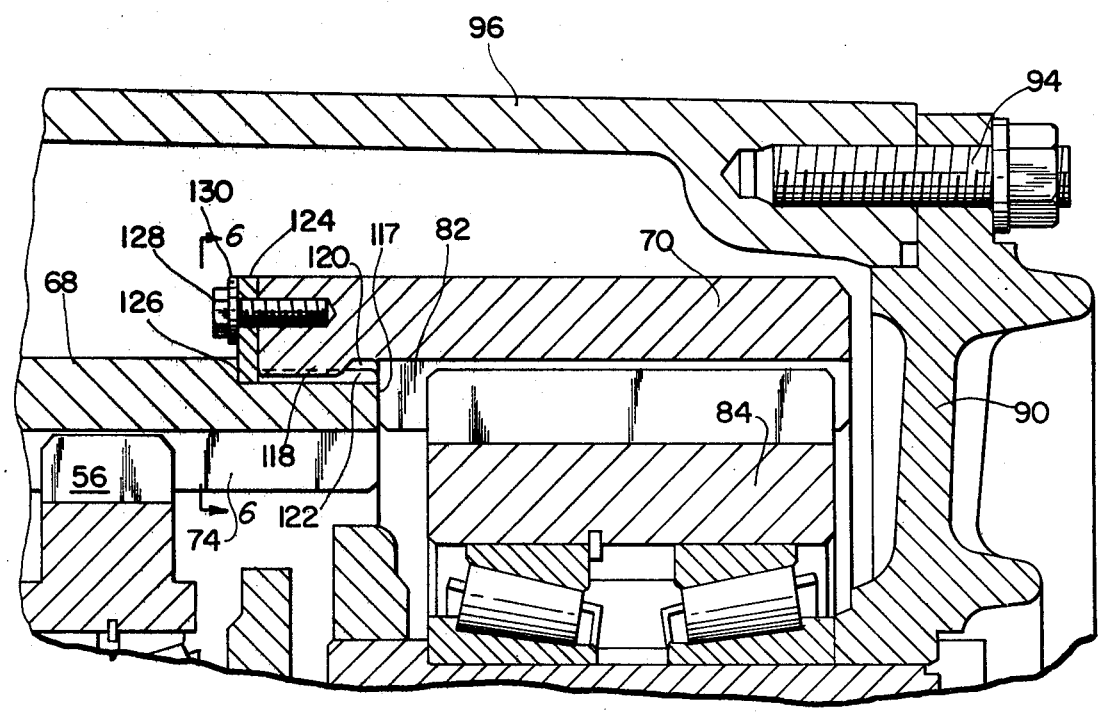
FIG. 5 is an enlarged view of a portion of FIG. 4.

The second component or piece 70 of the composite ring gear is mounted to and held by ring gear piece 68 through a clipped off extension of the internal teeth 82 of ring gear piece 70. This structure is shown in detail in FIGS. 4 and 5. The internal teeth 82 have been clipped off in the region or area designated 117, adjacent an edge of the ring gear piece, with the clipped off teeth of shorter length being designated 118, and which are separated from the remainder of the teeth by a groove 120, for definition and separate teeth formation. The clipped off teeth 118 engage with shallow matching external teeth 122 provided on the exterior of ring gear piece 68 adjacent an edge thereof. A plurality of keeper plates 124 are provided which extend partially into external slots 126 which are located on the outer diameter between the inner ends of shallow matching teeth 122 and the remainder of ring gear 68. Bolts 128 extend through the keeper plates 124 and removably mount and secure them on the end of ring gear component 70. These keeper plates removably secure and hold the two gear pieces 68 and 70 together, and provide, as an entity, the composite ring gear assembly. Bent over tabs 130 on the locking keeper plates 124 prevent the bolts 128 from loosening. It is to be noted that this method and structure of jointing or joining allows the same radial flexing and floating as the mounting of the gear segment 68 to its hub 64 permits.

As an alternative to the foregoing construction it is possible that the mounting and holding joint can be made of separate spline teeth, which may be desirable when the internal ring gear teeth 82 of gear segment 70 are of very coarse pitch. Such a structure is within the scope and teachings of the present invention, and can be readily provided. The number of keeper plates or locks can vary as necessary or desired. It is contemplated, for example, that in structures presently in use there may be four or six of these locks, although more or less can be used.

The composite or two piece ring gear as shown and described has additional advantages. Different gear pitches can be used, a finer pitch being used for the lighter loaded inner planetary as an example. This can provide economies both of weight and manufacturing costs. The stepped ring gear diameters also allow greater ranges of ratios of the double planetary.

While a preferred embodiment of the invention has been shown and described, manifestly minor changes can be effected in details of structure, without departing from the spirit and the scope of the invention, as defined in, and limited solely by the appended claims.

What is claimed is:

1. A composite ring gear comprising first and second ring gear components, said ring gear components being of different diameters, one said ring gear component having internal teeth adjacent an edge thereof, and the other said ring gear component having external teeth adjacent an edge thereof, said teeth on said components being of matched configuration and size, said components being joined together with the respective internal and external teeth being interengaged, and means fixedly attaching the so joined components to form a single composite ring gear entity.

2. A composite ring gear as claimed in claim 1, said teeth respectively on said ring gear components being spline teeth adapted for interengagement and partially constituting joinder means therefor.

3. A composite ring gear as claimed in claim 1, said teeth on one said ring gear component comprising gear teeth adapted for operative association in a gearing arrangement, said gear teeth having an extension thereof clipped off and of shorter length, the matching teeth on the other said component being shallow and formed in a surface thereof free from gearing arrangement teeth.

4. A composite ring gear as claimed in claim 3, the larger diameter ring gear component being internally toothed with said gear teeth, and the clipped off teeth being formed as an extension thereof, the smaller diameter ring gear component being internally toothed with gearing arrangement operational gear teeth with said matching shallow teeth being in the outer diameter surface thereof.

5. A composite ring gear as claimed in claim 4, the smaller diameter ring gear component having at least one peripheral slot in the outer diameter positioned at the inner end of said shallow teeth, a keeper plate partially inserted in said slot, and means attaching said keeper plate to the edge of said larger diameter ring gear component outward of said clipped off teeth.

6. A composite ring gear as claimed in claim 5, said attaching means comprising a threaded bolt engaged in a threaded bore in said edge of said larger diameter ring gear component, said keeper plate having a bent over tab engaging the head of said bolt to prevent loosening thereof.

7. A composite ring gear as claimed in claim 6, wherein a plurality of slots and attached keeper plates are provided for secure attachment of said two ring gear components.

8. A composite ring gear as claimed in claim 2, the smaller diameter ring gear component having at least one peripheral slot in the outer diameter positioned at the inner end of said teeth thereon, a keeper plate partially inserted in said slot and means attaching said keeper plate to the edge of said larger diameter ring gear component outward of said teeth therein.

9. A composite ring gear as claimed in claim 8, said attaching means comprising a threaded bolt engaged in a threaded bore in said edge of said larger diameter ring gear component, said keeper plate having a bent over tab engaging the head of said bolt to prevent loosening thereof.

10. A composite ring gear as claimed in claim 9, wherein a plurality of slots and attached keeper plates are provided for secure attachment of said two ring gear components.

11. A composite ring gear as claimed in claim 7, wherein said composite ring gear is operatively connected in a double planetary reduction final drive gearing arrangement, said composite ring gear providing a stepped reduction gear ratio.

12. A composite ring gear as claimed in claim 11, said final drive gearing arrangement including a mounting hub for the smaller diameter ring gear component, said hub having teeth in the outer diameter thereof matingly engaged with the internal teeth of the smaller diameter ring gear component, an inner groove in said smaller diameter component, and locks attached to said hub and seated in said groove and securing the ring gear component to said hub.

13. A composite ring gear as claimed in claim 11, said ring gear components having different gear pitches, with a finer pitch for interconnection in and with a lighter loaded inner planetary of said final drive gearing arrangement.

14. A composite ring gear adapted for operational incorporation in a gear assembly comprising a first internally toothed ring gear and a second internally toothed ring gear of larger diameter than said first ring gear, said second ring gear having an extension of the internal teeth thereof clipped off and of shorter length, and adjacent one side edge, said first ring gear having shallow teeth on the exterior diameter adjacent a side edge thereof, said shallow teeth and said clipped off teeth being of matching configuration and size, said first and second ring gears being connectedly interengaged with the matching teeth thereon in mating engagement, said ring gears as interengaged conjointly forming, as an entity, a two component ring gear of greater width than the single width of each of the components, and the entity constituting a single functional ring gear.

15. A composite ring gear as claimed in claim 4, said larger diameter ring gear component having a peripheral groove in the inner diameter thereof between the internal teeth and the clipped off extension.